…

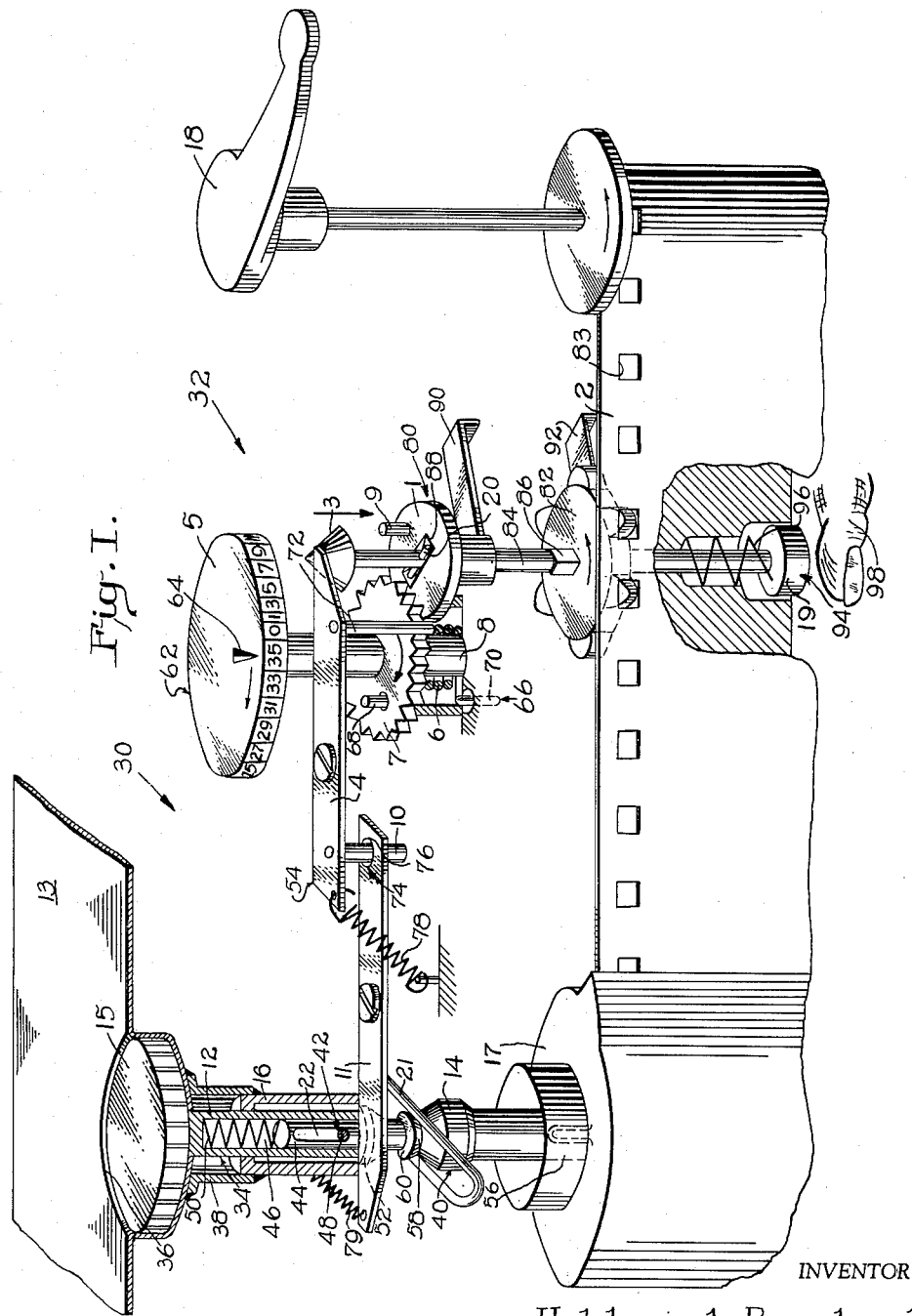

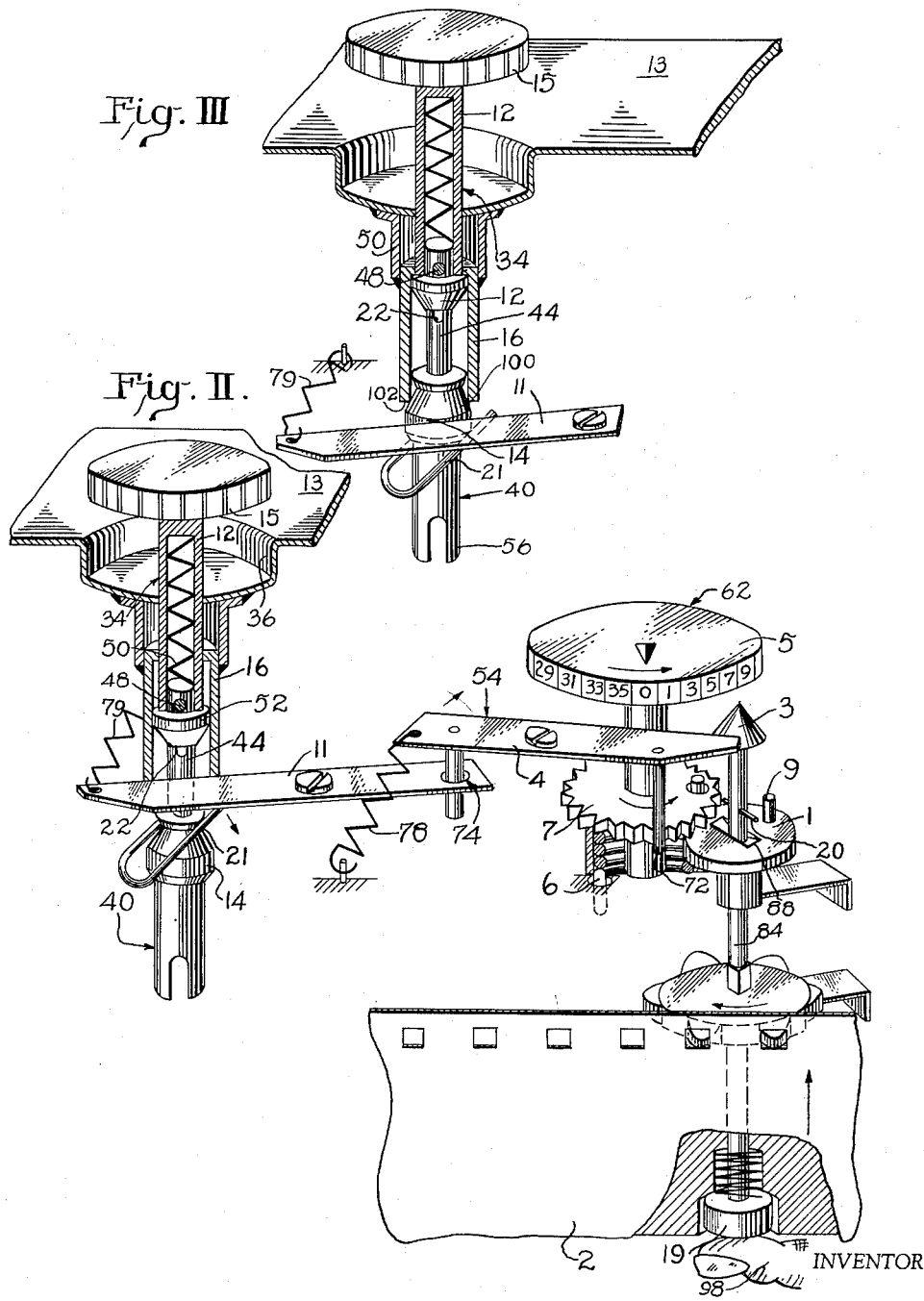

United States Patent Office 2,984,428
Patented May 16, 1961

2,984,428

RELEASE DEVICE FOR FILM REWIND AND FRAME COUNTER IN A PHOTOGRAPHIC CAMERA

Holderied Bernhard, Bressanone, Bolzano, Italy, assignor to Durst Soc. p. A., Fabbrica Macchine ed Apparecchi Fototecnici, Bolzano, Italy Filed Aug. 18, 1959, Ser. No. 834,510

Claims priority, application Italy Oct. 22, 1958

10 Claims. (Cl. 242—71.6)

This invention relates to release devices for the film rewind and frame counter of a photographic camera, and more particularly relates to a combined form of such a device.

Presently available devices for releasing the frame counter and rewind knob of photographic cameras such as those utilizing 35 mm. film are separately actuated. For example, the frame counter springs back to the zero mark or starting condition when the camera back is opened, and only after a second lever is operated does the rewind knob spring away from the camera casing into the position in which it can be conveniently manipulated to rewind the film back into the spool or cassette. Furthermore, this film spool can only be removed or exchanged after the back of the camera or a bottom plate is removed.

An object of this invention is to provide a relatively simple device for simultaneously releasing the film rewind and frame counter of a photographic camera; and Another object is to provide such a device by which the film spool can be released for removal or replacement without the necessity of removing a portion of the camera casing.

In accordance with this invention, a rewind knob element is mounted to slide axially within a bearing secured within the casing, and a separate rewind stem is connected coaxially to the knob element by means of a slotted coupling. A detent linkage normally engages a stop upon the rewind knob element to hold it in a position adjacent the casing against the reaction of a resilient means which forces it away, and this detent linkage is also engaged with the counter to condition it to indicate the passage of successive frames of film. A manually operable disconnecting linkage permits the detent linkage to be simultaneously disengaged from the rewind knob and the counter to simultaneously cause the knob to move away from the casing to facilitate rewinding and cause the counter to automatically return to the zero mark. Furthermore, the rewind stem is held in the position where it engages the film spool by a resilient catch, and it can be released from the catch by an outward pull upon the rewind knob which disengages the stem from the film spool and also interposes a cam surface mounted upon the stem in contact with the detent linkage to maintain it disengaged from the counter. This maintains the counter disengaged at the zero mark during the entire time that the rewind knob is pulled out and the stem held in the disengaged position.

Novel features and advantages of the present invention will become apparent to one skilled in the art from a reading of the following description in conjunction with the accompanying drawings wherein similar reference characters refer to similar parts and in which:

Fig. I is a diagrammatic perspective view of an embodiment of this invention in the film winding phase of operation;

Fig. II is a fragmentary view similar to Fig. I in the rewinding phase of operation; and Fig. III is a more fragmentary view of a portion of the embodiment shown in Fig. I in the film spool removing phase of operation.

In Fig. I is shown a portion of a camera 30 which includes a casing 13 and three elements disposed external of this casing to make them accessible and operable to a photographer. These external elements are rewind knob 15, frame counter disc 5 and film-winding and shutter-cocking lever 18. The rest of the elements mentioned herein with the exception of release button 19 are disposed within casing 13, and are incorporated in a novel device 32 for simultaneously releasing the film rewind and frame counter upon actuation of release button 19. Lever 18 operates to wind film and cock the shutter by unidirectional thumb actuation in accordance with any available mechanism of the illustrated type which is not herein described in detail.

Device 32 includes a rewind knob element 34 having a knob 15 which is, for example, disposed within a well 36 in casing 13 in the winding condition shown in Fig. I, and it also includes a hollow shaft 12 which slides axially within a bearing 16 secured to casing 13 by flanged collar 38. A rewind stem 40 is coupled coaxially to rotate with rewind knob element 34 by a slotted coupling 42 which includes, for example, a slotted cylindrical extension 44 of rewind stem 40 which slides within the hollow interior 46 of rewind knob element shaft 12. A pin 48 is secured to shaft 12 and is inserted within slot 22 of rewind stem 40 to permit a predetermined amount of relative axial movement between knob element 34 and stem element 40. A resilient means which is, for example, a compression spring 50 is inserted within hollow interior 46 of rewind knob shaft 12 and reacts between the end of stem element 40 and knob element 34 in a direction to urge knob 15 to move out of well 36 and away from casing 13. In Fig. I, rewind knob element 34 is maintained in its well 36 adjacent casing 13 by engagement of collar stop means 52 of rewind knob element 34 with a portion of detent linkage 54 which is later described in detail, namely with pivoted lever 11.

Rewind stem 40 is maintained in the position in which its slotted end 56 engages film spool 17 by engagement of resilient catch or spring 21 within a groove 58 formed between relatively smaller and larger diameter portions 60 and 14 of stem 40.

Also shown in Fig. I is frame counter means 62 which, for example, includes a counter disc 5 marked with a series of numbers which move past a stationary index mark 64 mounted upon casing 13 to indicate the passage of successive frames of film. Counter disc 5 is connected by means of shaft 8 to a sprocket wheel 7 which is resiliently angularly urged in the zero direction by resilient means 66 which comprises a torsion spring 6 whose ends 68 and 70 respectively are connected to sprocket wheel 7 and a stationary portion of the camera. Sprocket wheel 7 is conditioned to indicate the passage of successive frames of film when it is engaged by detent pin 72 mounted upon the outer end of pivoted lever 4 of the aforementioned detent linkage 54. Since the two adjacent ends of levers 4 and 11 are connected to each other by a loose coupling 74, provided, for example, by a pin 10 on lever 4 which is inserted through a slightly larger hole 76 in the end of lever 11, the reaction of springs 78 and 79 upon these levers maintains lever 11 engaged with stop collar 52 on rewind knob element 34 and detent pin 72 engaged with sprocket wheel 7 to respectively hold knob 15 down within well 36 and permit intermittent advancement of sprocket wheel 7 without disengaging lever 11 from stop collar 52 (by virtue of loose coupling 74).

A counter-driving means 80 which includes a pin 9 mounted upon a disc 1 is mounted adjacent counter means 62 in a position in which pin 9 periodically strikes sprocket wheel 7 as frames of film are transported or advanced through the camera. This actuation in conjunction with detent pin 72 actuates counter disc 5 to indicate the numbers of the successive frames opposite index mark 64. Counter-driving means 80 also includes a film engaging sprocket 82 whose teeth are engaged by perforations 83 of film 2 as they pass through the camera to rotate sprocket 82 and shaft 84 with which it is caused to rotate by mounting of its square hole upon shaft portion 86. Shaft 84 is also detachably connected to disc 1 by pin 20 and corresponding rectangular slot 88 in disc 1. Disc 1 and sprocket 82 are maintained in their axial positions by suitable bearings 90 and 92.

A manually operable disconnecting means 94 includes disconnecting button 19 mounted upon the bottom of casing 13 which also is secured to shaft 84 and resiliently urged into the engaged condition shown in Fig. I by compression spring 96. Disconnecting means 94 also includes a cam surface 3 upon the end of shaft 84 which is, for example, cone-shaped to engage the end of lever 4 of detent linkage 54 for disengaging it in the manner later described when disconnecting button 19 is pushed by finger 98 in the illustrated manner.

In Fig. II, finger 98 has pushed button 19 inwardly thereby moving shaft 84 and cone 3 upwardly to disengage detent linkage 54 from stop collar 52 of rewind knob element 34 and detent pin 72 from retentive contact with sprocket 7. This respectively permits rewind knob 34 to spring up to the position where knob 15 rises out of well 36 and counter disc 5 automatically rotates back to the zero position under the influence of torsion spring 6. Rewind knob 15 is prevented from rising further by contact of pin 48 attached to rewind knob shaft 12 with the top of slot 22 in the inserted end of rewind stem element 40. In this condition, film can be conveniently rewound upon spool 17 (not shown in Fig. II) without disturbing the zero position of the counter.

During the rewinding operation, the counter may be inactivated by maintaining pressure on button 19 which maintains pin 20 on shaft 84 disengaged from slot 88 thereby preventing rotational movement of shaft 84 from being transmitted to disc 1. However, if button 19 is released, pin 20 will once more engage slot 88 thereby permitting counter 62 to rotate counter disc 5 in the backward direction which provides an indication to the photographer of the number of frames being rewound. This optional mode of operation provides either extreme freedom of motion or frame indication during rewinding in accordance with the preference of the photographer.

In Fig. III, film rewinding has been completed, and the photographer has then pulled axially outwardly upon knob 15 which moves it a little further out from the casing 13 since pin 48 bearing against the top of slot 22 has simultaneously carried stem element 40 upwardly out of engagement with spring catch 21. This disengages slotted end 56 of stem element 40 from spool 17 (not shown) to permit its removal or exchange. The upward movement of stem 40 is, ultimately stopped by contact of enlarged tapered surface 100 with the lower end 102 of sleeve bearing 16, and at the same time enlarged hub 14 of stem element 40 is interposed into contact with lever 11 of detent linkage 54 to maintain it in the disengaged condition shown in Fig. II as long as knob 15 is pulled out to the extreme position shown in Fig. III. This permits removal and replacement of film spools without disturbing the zero position of the counter.

Summary of operation

When a photographer is using the camera in the normal mode of operation to take successive pictures, release device 32 is in the condition shown in Fig. I with rewind knob 15 maintained recessed within well 36 by engagement of the side of lever 11 with collar 52 on rewind knob element 34. At the same time, detent pin 72 on the other pivoted lever 4 of detent linkage 54, resiliently engages successive teeth of sprocket wheel 7 which are intermittently driven past it when they are periodically struck by rotational movement of pin 9 on counter-driving disc 1 in response to advancement of film 2 through the camera to condition the counter to indicate the number of the frame of film being exposed.

When the film is to be rewound, button 19 is pressed as shown in Fig. II to simultaneously release rewind knob element 34 from lever 11 and detent pin 72 from sprocket wheel 7. This allows rewind knob 15 to spring out of well 36 and counter disc 5 to rotate back to its zero position in response to the released reaction of torsion spring 6. The upward movement of knob 15 is stopped when rewind element pin 48 strikes the top of slot 22 in rewind stem 40 which is itself still maintained engaged with film spool 17 to permit convenient rewinding of the film upon spool or cassette 17 in the position shown in Fig. II. At the same time, disconnecting shaft 84 itself disengages from counter-driving disc 1 by the lifting of pin 20 out of slot 88. If button 19 is maintained depressed during rewinding, extreme freedom of rotation of the rewind mechanism is provided. However, if this button is released, detent linkage lever 11 can return to the position shown in Fig. I, and pin 20 return into slot 88 to permit the counter to provide a reverse indication of the number of frames being rewound. This device accordingly provides the photographer with a choice of one of two optional conditions during rewinding in accordance with his preference.

When the rewinding operation is completed and film spool 17 is to be removed or replaced, knob 15 is manually pulled out still further from the position shown in Fig. II to that shown in Fig. III to disengage rewind stem 40 from catch spring 21 and disconnect slotted end 56 of stem 40 from the film spool. This releases the film spool without requiring the casing to be opened. At the same time, enlarged hub 14 of stem 40 is interposed against the side of lever 11 thereby maintaining detent linkage 54 disengaged from counter means 62 to prevent the counter mechanism from interfering or being interfered with during the removal or replacement of film spools.

After the film spool is replaced or the camera inactivated without replacement of film, knob 15 is manually depressed to lie within well 36, thereby returning the device automatically to the condition shown in Fig. I once more in readiness for operation. In this condition, the disposition of knob 15 within well 36 provides an extremely smooth and projection-free surface for the camera casing as well as preventing interference with rotation of knob 15 during the course of taking successive pictures.

What is claimed is:

1. A combined film rewind and frame counter release device for a photographic camera utilizing a film spool comprising a rewind knob element including a knob, slide bearing means attached to the casing of said camera, said rewind knob element being mounted to slide axially within said bearing thereby allowing the knob to assume a position adjacent said casing during the winding of the film and remote from said casing to facilitate rewinding, a resilient means which reacts upon said rewind knob element in a direction which urges the knob away from said casing, a rewind stem element including connecting means for engaging said film spool, slotted coupling means connecting said stem element to rotate coaxially with said knob element and permitting a predetermined axial relative movement therebetween in response to the reaction of said resilient means, a rotatable frame counter means mounted upon said casing, another resilient means biasing said counter towards its starting position, said rewind knob element including stop means for allowing it to be held in said position adjacent said casing, a detent linkage operatively associated with said rewind knob element and said counter means for maintaining said rewind knob held in its position adjacent said casing when engaged with said stop means and for conditioning said counter to indicate the passage of successive frames of film when it is engaged therewith, and a manually operable disconnecting means operatively associated with said detent linkage for disengaging said detent linkage from said stop means and said counter to simultaneously release said rewind knob for movement away from said casing to facilitate rewinding and return said counter to its starting position.

2. A rewind device as set forth in claim 1 wherein said rewind stem includes a catch-engaging means, a resilient catch mounted upon said casing and operatively associated with said catch-engaging means for maintaining said rewind stem engaged with said film spool, said catch and said engaging means being made to disengage and allow said stem to move with said rewind knob under an axial pull of said rewind knob away from said casing to uncouple said stem from said film spool to permit it to be removed from the camera, and a surface means mounted upon said rewind stem formed to contact said detent linkage to maintain it disengaged from said counter means when said rewind stem is released from said catch.

3. A device as set forth in claim 2 wherein said rewind knob element includes a hollow shaft, said rewind stem having a slotted end which is inserted to slide within said hollow shaft, a pin being secured to said hollow shaft and inserted through said slotted end to provide said slotted coupling means connecting said stem element to said knob element, said catch-engaging means upon said stem comprising a groove disposed between a pair of projections and the one of said projections adjacent the portion of said stem which engages said film spool being contiguous to a hub which provides said surface means for contacting said detent linkage.

4. A device as set forth in claim 3 wherein said disconnecting means comprises a shaft with a portion disposed adjacent said detent linkage, a cam surface being mounted upon said shaft in position to contact said detent linkage, a counter-driving means also being mounted upon said shaft, and axially movable means connecting said counter-driving means to said shaft to permit an axial movement of said shaft to simultaneously disengage said detent linkage from said counter and said shaft from said counter-driving means.

5. A device as set forth in claim 1 wherein said disconnecting means comprises a shaft with a portion disposed adjacent said detent linkage, a cam surface being mounted upon said shaft in position to contact said detent linkage, a counter-driving means also being mounted upon said shaft, and axially movable means connecting said counter-driving means to said shaft to permit an axial movement of said shaft to simultaneously disengage said detent linkage from said counter and said shaft from said counter-driving means.

6. A device as set forth in claim 5 wherein said cam surface comprises a cone mounted upon the end of said shaft, said counter means includes a film-engaging sprocket, sliding means securing said sprocket to rotate with said shaft to permit movement of said film to rotate said shaft and said counter-driving means mounted upon it, said counter-driving means comprising a disc including a projection, said counter including a sprocket wheel whose teeth are disposed in the path of movement of said projection, and said axially movable means connecting said counter-driving means to said shaft including a pin fastened to said shaft and a slot in said disc.

7. A device as set forth in claim 1 wherein the external surface of said casing adjacent said knob is formed to include a well, and said rewind knob lies within said well in its position adjacent said casing.

8. A device as set forth in claim 1 wherein said detent linkage comprises a pair of pivoted levers having one pair of their ends disposed adjacent each other, loose coupling means connecting said adjacent pair of ends of said levers, one of said levers having its outer end bearing against said rewind knob to engage said stop means, the other of said levers including upon its outer end a detent pin which engages said counter means, and said loose coupling permitting said detent pin to allow intermittent advancement of said counter without disengaging said other lever from said stop means upon said rewind knob.

9. A device as set forth in claim 8 wherein said loose coupling is provided by a projecting pin attached to one of said levers which extends through a slightly larger hole in the other of said levers.

10. A rewind device as set forth in claim 1 wherein said rewind stem includes projection means, a resilient catch mounted upon said casing and operatively associated with said projection means for maintaining said rewind stem engaged with said film spool, said catch and said projection being made to disengage and allow said stem to move with said rewind knob under an axial pull of said rewind knob away from said casing to uncouple said stem from said film spool to permit it to be removed from the camera, said projection means also providing a surface which is formed to contact said detent linkage to maintain it disengaged from said counter means when said rewind stem is released from said catch, said detent linkage comprises a pair of pivoted levers having one pair of their ends disposed adjacent each other, loose coupling means connecting said adjacent pair of ends of said levers, one of said levers having its outer end bearing against said rewind stem to engage said stop means and said cam surface means, and said loose coupling permitting said detent pin to allow intermittent advancement of said counter without disengaging said other lever from said stop means upon said rewind knob.

References Cited in the file of this patent
UNITED STATES PATENTS

| | | |
|---|---|---|
| 2,140,445 | Mihalyi | Dec. 13, 1938 |
| 2,148,636 | Muller et al. | Feb. 28, 1939 |
| 2,245,214 | Mihalyi | June 10, 1941 |

UNITED STATES PATENT OFFICE
CERTIFICATE OF CORRECTION

Patent No. 2,984,428         May 16, 1961

Bernhard Holderied

It is hereby certified that error appears in the above numbered patent requiring correction and that the said Letters Patent should read as corrected below.

In the grant, line 1, and in the heading to the printed specification, line 5, name of inventor, for "Holderied Bernhard", each occurrence, read -- Bernhard Holderied --; in the drawings, Sheets 1 and 2, line 1, for "H. BERNHARD", each occurrence, read -- B. HOLDERIED --; in the drawings, Sheets 1 and 2, lower right-hand corner, for "Holderied Bernhard", each occurrence, read -- Bernhard Holderied --.

Signed and sealed this 17th day of October 1961.

(SEAL)
Attest:

ERNEST W. SWIDER         DAVID L. LADD
Attesting Officer          Commissioner of Patents
                       USCOMM-DC